(12) United States Patent
Stoddard et al.

(10) Patent No.: US 9,515,600 B2
(45) Date of Patent: Dec. 6, 2016

(54) SOLAR MODULE INSTALLATION SYSTEM AND METHOD

(71) Applicant: SolarWorld Americas Inc., Hillsboro, OR (US)

(72) Inventors: Nathan Stoddard, Beaverton, OR (US); Beryl Weinshenker, Portland, OR (US)

(73) Assignee: SolarWorld Americas Inc., Hillsboro, OR (US)

( * ) Notice: Subject to any disclaimer, the term of this patent is extended or adjusted under 35 U.S.C. 154(b) by 0 days.

(21) Appl. No.: 14/703,266

(22) Filed: May 4, 2015

(65) Prior Publication Data

US 2016/0329858 A1 Nov. 10, 2016

(51) Int. Cl.
*H02S 20/20* (2014.01)
*H02S 40/34* (2014.01)
*B23P 19/00* (2006.01)

(52) U.S. Cl.
CPC ............... *H02S 20/20* (2014.12); *B23P 19/00* (2013.01); *H02S 40/34* (2014.12)

(58) Field of Classification Search
CPC .. F24J 2/5241; F24J 2/5264; F24J 2002/5286; F24J 2002/5458
See application file for complete search history.

(56) References Cited

U.S. PATENT DOCUMENTS

| | | | | |
|---|---|---|---|---|
| 4,466,423 A | * | 8/1984 | Dolan | F24J 2/16 126/571 |
| 4,832,001 A | | 5/1989 | Baer | |
| 8,448,390 B1 | * | 5/2013 | Clemens | F24J 2/5258 126/623 |
| 2008/0168981 A1 | * | 7/2008 | Cummings | F24J 2/5241 126/600 |
| 2009/0078299 A1 | * | 3/2009 | Cinnamon | F24J 2/5211 136/244 |
| 2011/0155218 A1 | | 6/2011 | Büchel et al. | |
| 2013/0119206 A1 | * | 5/2013 | Di Gaetano | F24J 2/5241 248/49 |

FOREIGN PATENT DOCUMENTS

KR 20120023248 A * 3/2012 .................. F24J 2/16

OTHER PUBLICATIONS

Korean Patent Office provided English Translation of KR 20120023248 A.*

* cited by examiner

*Primary Examiner* — Devina Pillay
*Assistant Examiner* — Daniel Malley, Jr.
(74) *Attorney, Agent, or Firm* — Maginot, Moore & Beck LLP (57) ABSTRACT

A solar panel installation includes at least one support cable and at least two support structures configured to hold the at least one support cable in suspension therebetween. The solar panel installation includes at least one solar module having a frame and at least one cable retaining structure secured to the frame. The at least one support cable is configured to support the solar module aloft when the at least one support cable is being held in suspension between the first and the second anchor. The solar module is configured to be slid along the at least one support cable between the support structures when the solar module is being held aloft by the at least one support cable.

10 Claims, 8 Drawing Sheets

SOLAR MODULE INSTALLATION SYSTEM AND METHOD

TECHNICAL FIELD

The disclosure relates generally to solar modules and, in particular, to systems and methods of installing and supporting solar modules.

BACKGROUND

Photovoltaic cells, or solar cells, are often electrically connected, encapsulated in a connected matrix to form a laminate and mounted in a frame with electrical connectors to form a module. The frame is not necessarily an integral part of the module, however, and can be omitted if other means are employed for electrical grounding, laminate edge protection and physical support. In typical solar installations, several solar modules are typically used in conjunction to convert solar energy into electrical energy. In such a solar module installation, the solar modules are typically arranged in a two dimensional array to cover as much of the available area as possible. However, before solar modules can be installed, the installation area must be prepared and suitable support structures must be put in place so that the solar modules can be arranged in appropriate positions and orientations to receive a maximum amount of sunlight.

Current practice for large ground-mounted solar module installations is first to clear the land of bushes, trees and tall plants, then in many cases to grade the land to even out the earth. The support structures (typically aluminum or steel rack structures) are then mounted in the ground. The solar modules are then mounted to the racking. Such previously known preparation and support methods can be expensive and time consuming to implement which can be prohibitive in some cases.

There is a need for solar module installations having reduced costs. The approach we describe saves cost in the preparation of the installation area and for the support system, enables easier installation in common locations, and also allows the installation of solar arrays in locations where solar module installations could not normally be placed, such as over rocky or rough terrain or over ravines, ponds, lakes and wetlands.

SUMMARY

In accordance the present disclosure, a solar panel installation comprises at least one support cable; a first anchor structure and a second anchor structure configured to hold the at least one support cable in suspension there between; and at least one solar module. The solar module includes a laminate comprising a planar solar collection area, a photovoltaic cell mounted within said area, at least one element of module-level power electronics (e.g. a junction box, microinverter or the like) that is electrically connected to at least one of said photovoltaic cells, and at least one cable retaining structure secured to the laminate. The module may comprise a frame or other structure mounted to the laminate to aid in the physical support given by the cable retaining structure. The at least one cable retaining structure is configured to be slidably attached to the at least one support cable. The at least one support cable is configured to support the solar module aloft when the at least one support cable is being held in suspension between the first and the second anchor. The solar module is configured to be slid along the at least one support cable between the first and the second anchor structure when the solar module is being held aloft by the at least one support cable.

According to another embodiment, a method for a solar panel installation comprises slidably attaching a first solar module to a first support cable and a second support cable wherein the first support cable and the second support cable are suspended between a first anchor structure and a second anchor structure and the first solar module is attached and held aloft by the first and second support cables at a first position between the first anchor structure and the second anchor structure. The first solar module is then slid from the first position to a second position between the first anchor structure and the second anchor structure. A second solar module is then slidably attached to the first support cable and the second support cable at the first position after the first solar module has been slid to the second position. This process can be iterated for as many solar modules as can fit between the cable anchors.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Figure 1:
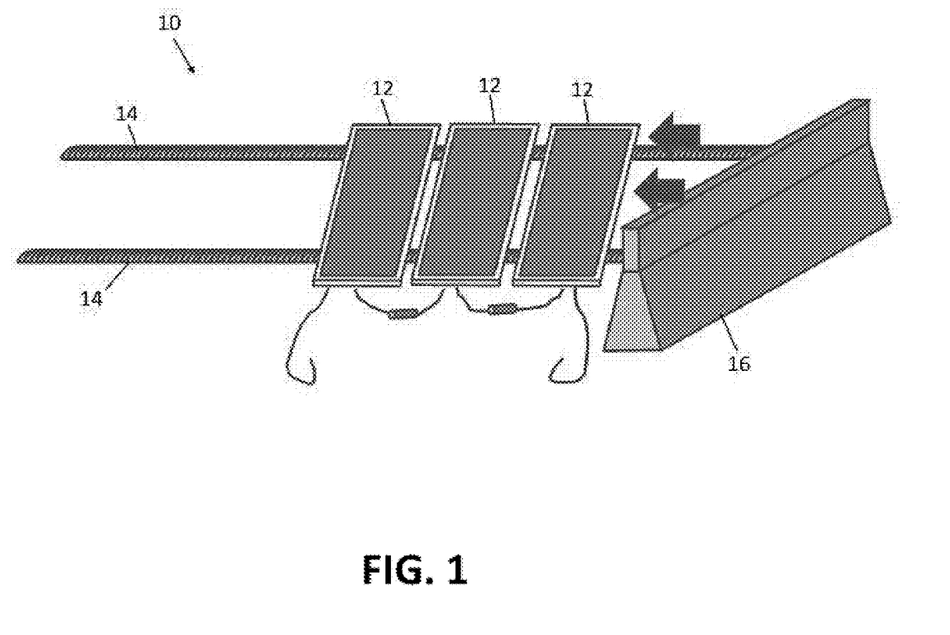
FIG. 1 is a schematic illustration of an embodiment of a solar module installation in accordance with the present disclosure.

Referring to FIG. 1, the disclosure is directed to a solar module installation in which a plurality of solar modules 12 are supported on two (or more) parallel support cables 14, such as steel cables, that have been suspended between anchored and floating supports 16. The supports 16, also referred to herein as anchors, enable the cables and the solar modules to be suspended over long distances (e.g., 30-100 meters). The cables 14 are held under tension so that the solar modules 12 are held aloft between the anchors 16. By suspending the solar modules in this manner, the area over which the cables are extended and the solar modules are supported requires little to no preparation. Therefore, the costs associated with ground preparation, such as clearing and grading of the area, can be avoided. In addition, the use of cables as described herein also significantly reduces the cost and complexity of the support system used to support the solar modules.

The solar modules 12 are also configured to move with respect to at least one of the support cables 14, e.g., by sliding and/or rolling. This enables an installation method in which a solar module is mounted onto the support cables and electrically connected and then repositioned along the span to make room for mounting the next solar module. The solar module installation according to the present disclosure thus enables multiple solar modules to be delivered to and mounted from a single location thus saving time and reducing expenses by not requiring movement and/or transportation of equipment and personnel to many different locations. These benefits and others will be explained in more detail below.

Figure 2:
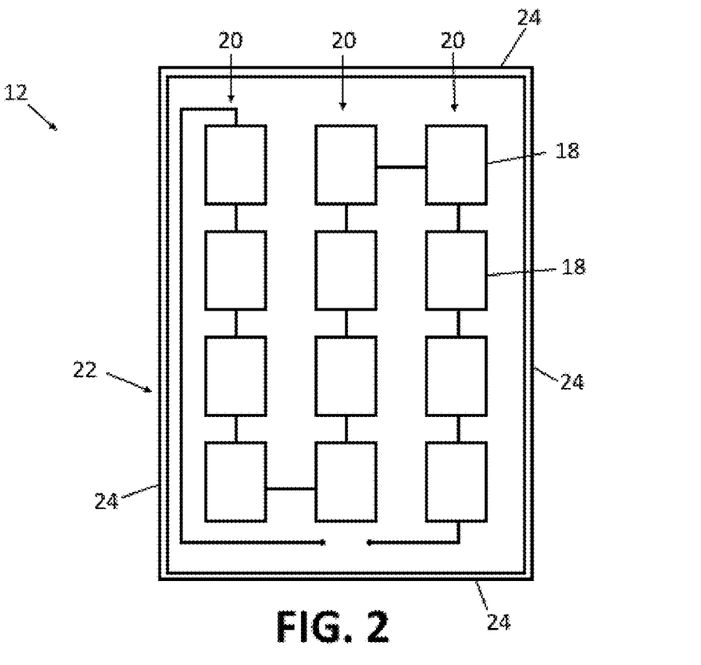
FIG. 2 is a schematic view of a front side of a solar module that may be utilized in a solar module installation, such as depicted in FIG. 1.
Figure 3:
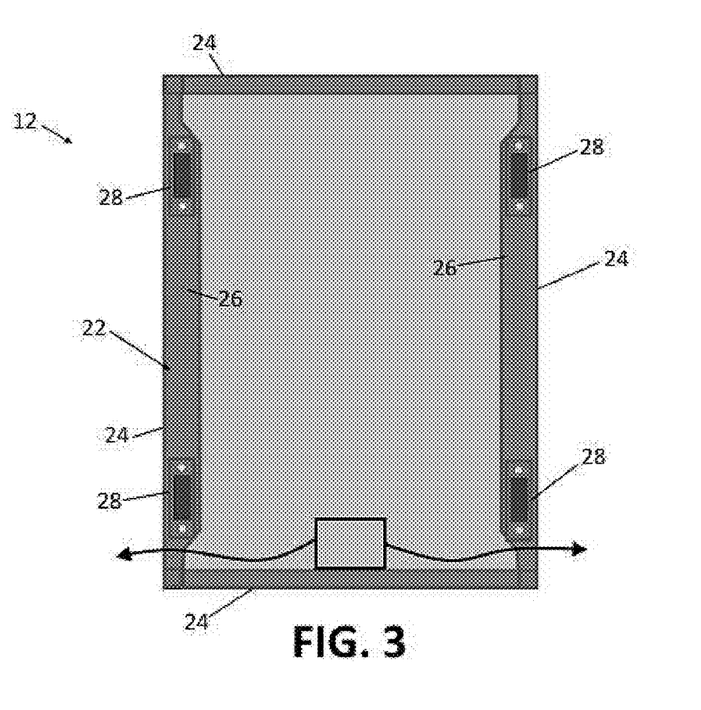
FIG. 3 is a schematic view of a back side of the solar module of FIG. 2.

An embodiment of a solar module 12 that may be supported by the cable support system is depicted in FIGS. 2 and 3. The solar module 12 may have a laminate structure comprising a photoelectrically active layer sandwiched between a front side layer (typically glass) and a back side layer. In general, the laminated structure is typically planar, and often rectangular in shape. The active layer is formed by at least one solar cell. The solar cells may be formed of any one of a crystalline silicon, amorphous silicon, cadmium telluride, chalcopyrite or other suitable material. The solar cells may be embedded in a transparent material which may be a polymer such as ethylene-vinyl acetate (EVA).

As depicted in FIG. 2, the active layer may comprise a plurality of solar cells 18 that are electrically connected with each other in series to form strings 20. In FIG. 2, the strings 20 are shown as being electrically connected in series. However, in alternative embodiments, the strings 20 may be connected in a parallel manner (not shown) with respect to each other or in a combination of series and parallel connections (not shown).

The solar module 12 can be adapted to be secured to a frame 22. In the exemplary figure shown, the frame 22 comprises longitudinal frame members 24 arranged along the edges of the laminate structure. The frame members 24 are secured to each other at the corners of the solar module 12. Each of the frame members 24 include a recess or gap (not shown) in which a corresponding edge of the laminate solar module structure is received. The frame members 24 may be formed of an extruded metal material, such as (but not limited to) steel and/or aluminum, and may be provided in a variety of sizes, shapes, and cross-sections. As can be seen in FIG. 3, the frame members 24 may further include flanges 26 integral with and extending from the frame member 20. The flanges 26 provides an attachment surface which can be used to attach other structures to the solar module, such as cable retaining structures 28 (described in more detail below). Alternately, the cable retaining structures can be attached directly to the laminate, or to pieces of reinforcing material mounted to the rear side of the laminate to improve physical rigidity.

Referring to FIG. 3, the solar module 12 is equipped with a connection interface composed of module-level power electronics (MLPE) 30. For example, a microinverter or MLPE 30 can be used to connect the solar cell strings 20 to other modules and, eventually, to external electrical equipment (not shown) and wiring 32. The MLPE 30 may be attached to the back side of the solar module 12 as depicted in FIG. 3. The MLPE 30 includes appropriate connectors (not shown) for electrically coupling the solar module 12 to external components. As can be seen in FIGS. 1 and 4-6, the solar modules may be connected to each other in a daisy chain configuration via the MLPE 30.

Figure 4:
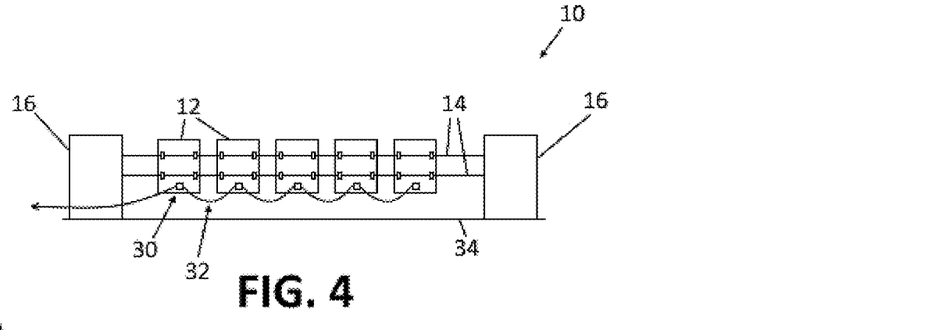
FIG. 4 is a schematic view of a solar module installation, such as depicted in FIG. 1, that utilizes two support structures.
Figure 5:
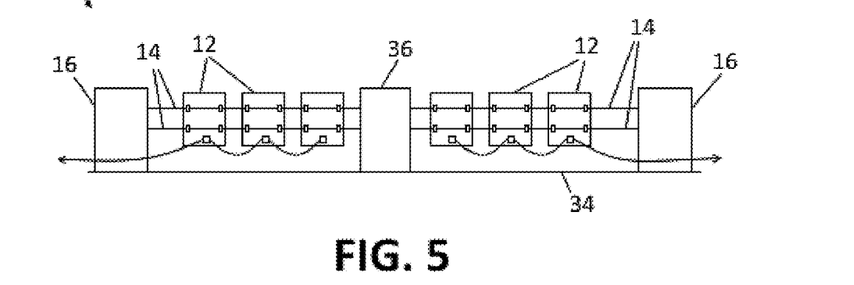
FIG. 5 is a schematic view of the solar module installation of FIG. 4 showing a different type of terrain between the support structures.

Embodiments of support structure and cable arrangements for solar module installations are depicted in FIGS. 4-7. As depicted in FIG. 4, the solar module installation includes support cables 14 and that are suspended between a pair of support structures, or anchors 16. The support cables 14 may be formed of a metal material, such as steel, copper, aluminum or some combination thereof, and may comprise a plurality of metal strands that are twisted to form a wire rope. In alternative embodiments, any suitable type of support cable or support line may be used that is capable of being held in tension between anchors 16 while supporting multiple solar modules 12.

Although two support cables 14 are depicted, it is contemplated that more than two support cables could be used. An additional one or more cables may be included for redundancy in case of damage to one of the main cables. Additional cables may also be used to support other components of the installation, such as electrical wiring and connection components and the like. It is also contemplated that a single support cable could be used to support the solar modules although such a configuration would have limited ability or would require separate measures to control the orientation of the solar modules.

The anchors 16 may comprise any suitable type of structure that is capable of retaining the support cables and holding the support cables with a sufficient amount of tension to suspend the cables (with a desired number of solar modules supported thereon) above an underlying support surface, e.g., ground 34, over wide spans, e.g., 30-100 meters. Anchors 16 may be formed by pre-existing structures or may comprise specially built, dedicated structures.

Two or more anchors 16 may be used in the same installation with one anchor positioned at each end of the spanning support cables.

FIG. 4 depicts an embodiment with a pair of anchors 16 which are used to support the ends of the support cables 14. In some embodiments, additional anchors or supports may be located mid-span at one or more locations between the end anchors 16. For example, in FIG. 5, a pair of anchors 16 are arranged to support the ends of the support cables 14 and an additional support structure 36 is located at a suitable position mid-span to provide additional support for the cables 14.

Figure 6:
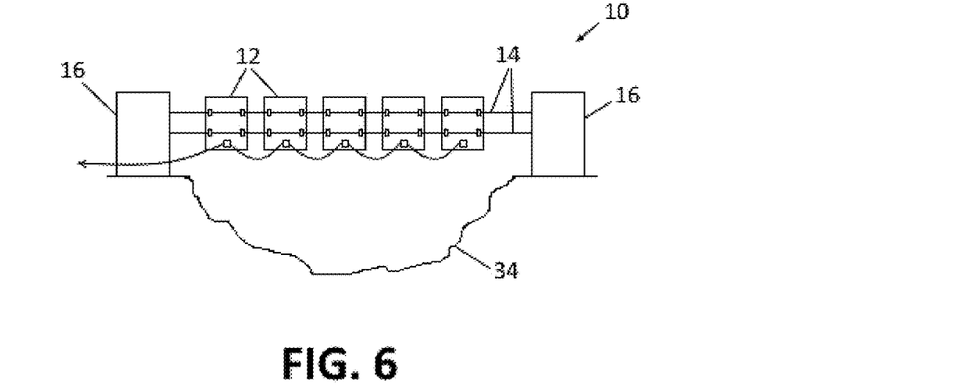
FIG. 6 is a schematic view of a solar module installation, such as depicted in FIG. 1, that utilizes more than two support structures.

The use of support cables 14 suspended between anchors 16 enables the solar modules installation 10 to be used in areas that would otherwise not be capable of supporting an installation. As an example, FIG. 6 depicts a solar module installation 10 in which the support cables 14 are positioned to span an area or region where a dip or drop-off is located. In this manner, solar modules may be installed in locations, such as spanning extremely rough and/or uneven landscape, crevices, ponds, lakes, water ways, wetlands and the like.

Figure 7:
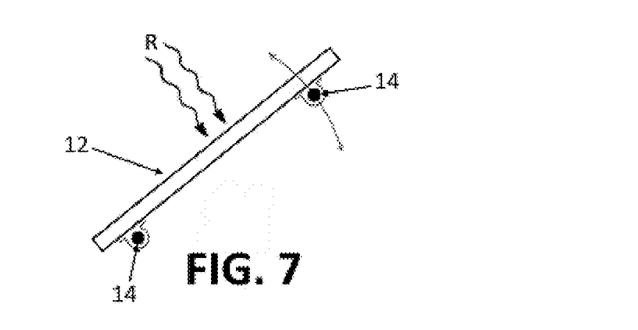
FIG. 7 is a side view of a solar module being supported on support cables of a solar module installation showing an angled orientation of the solar module.

The support structures 16, 36 may be configured to retain the support cables in any suitable manner. Referring to FIG. 7, the anchors 16 may be configured to hold the support cables 14 so that they are offset vertically with respect to each other in order to hold the tilt or orient the solar modules so that the front side glass is substantially perpendicular to the rays R of sunlight from the sun for at least a portion of the day. It is contemplated that one or more of the support cables 14 could be capable of moving vertically with respect to the support structures so that the tilt angle or orientation of the solar modules can be changed. For example, as is known in the art, the zenith of the sun could be tracked over the course of each day, and the tilt of the solar modules could be adjusted to follow the sun throughout the day. Tilt adjustments could happen continuously or semi-continuously to follow the sun over the course of a day, or could be made discretely according to a regular schedule, e.g. once a day, once a week, every few weeks, etc., to follow seasonal variations.

Figure 8:
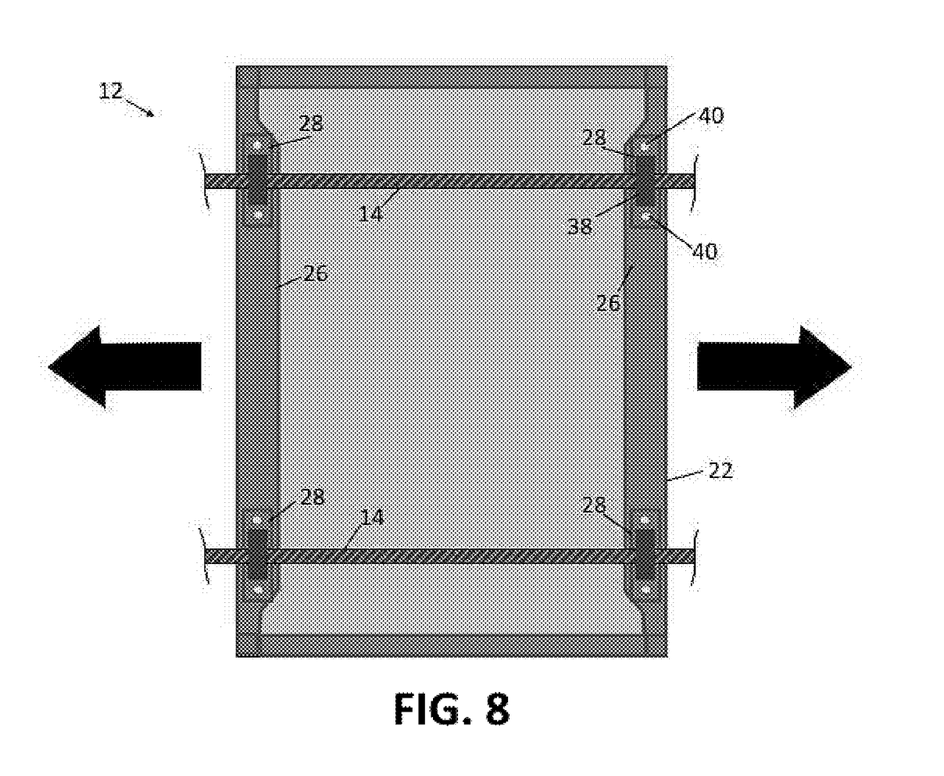
FIG. 8 depicts a back side view of a solar module showing the cable retaining structures of the solar module attached to the support cables.
Figure 9:
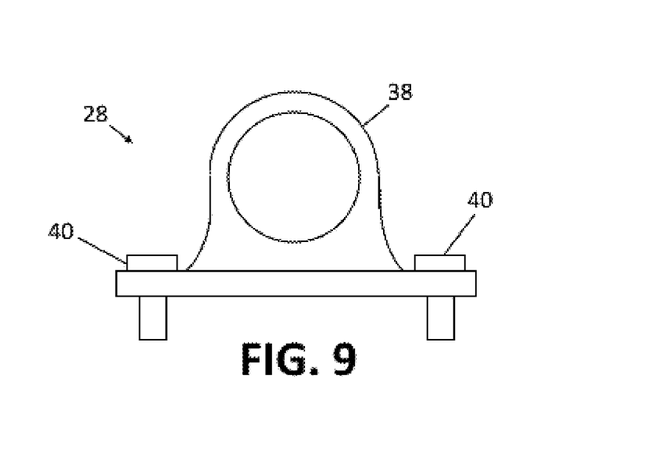
FIG. 9 depicts an embodiment of a cable retaining structure that may be used to attach solar modules to the support cables.

Referring now to FIGS. 8 and 9, the solar module 12 is provided with cable retaining structures 28 that enable the solar modules to be securely attached to the support cables 14. The cable retaining structure may comprise a collar 38 as depicted in FIG. 9 which is configured to surround and retain a support cable 14. The cable retaining structures 28 are attached at suitable locations to the back side of the frame 22, e.g., on a flange 26.

The cable retaining structures 28 may be secured to the frame 22 of the solar modules in any suitable manner, including fasteners, such as bolts 40, and/or by welding. Cable retaining structures may be permanently affixed to the frame 22. Alternatively, cable retaining structures may be configured to be installed and removed from the solar modules as needed. This enables the solar modules to be adapted to be supported on different cable configurations by installing the appropriate cable retainers as needed.

Figure 10:
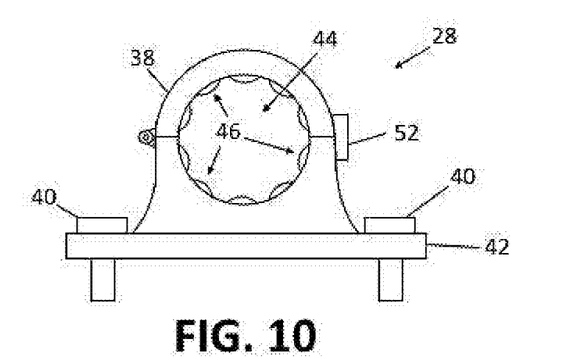
FIG. 10 depicts an embodiment of a cable retaining structure configured for sliding movement with respect to the support cables of the solar module installation using roller bearings.
Figure 11:
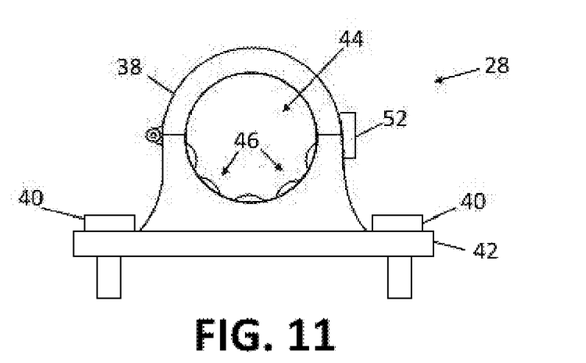
FIG. 11 depicts an alternative embodiment of the cable retaining structure of FIG. 12 in which the roller bearings are only provided in the region of engagement between the cable retaining structure and the support cables.

The cable retaining structures 28 may be configured to be movably attached to or movably supported on the support cables 14. Referring to FIGS. 10 and 11, a first embodiment of a movable cable retaining mechanism 28 is depicted. The cable retaining mechanism 28 of FIG. 10 includes a base 42 and a collar 38. The base 40 may comprise a generally flat plate that is secured to the solar module frame 22, e.g., by fasteners or bolts 40. The collar 38 extends from the base 42 and defines an opening 44 through which a support cable 14 is extended and retained.

The cable retaining structure 28 includes at least one bearing surface 46 arranged around at least a portion of the opening 44 for engaging the support cable 14 in a way that allows sliding or rolling along the cable with a suitably small moving friction. In the embodiment of FIG. 10, the at least one bearing surface 46 comprises a plurality of roller bearings arranged around the circumference of the opening 44. The bearing surface(s) 46 does not have to extend all of the way around the circumference of the opening 44 as in FIG. 10. The bearing surface(s) may be positioned to extend around only the portion of the circumference of the opening 44 where the support cable will be engaged. For example, the cable retaining structure of FIG. 11 includes roller bearings 46 that extend around only approximately a half of the circumference of the opening 44 of the collar 38.

Figure 12:
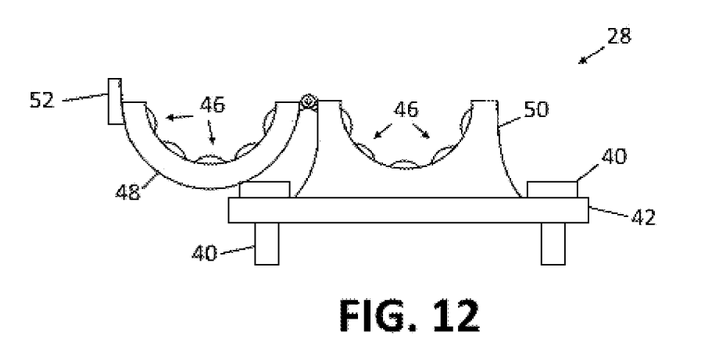
FIG. 12 depicts the cable retaining structure of FIG. 10 in an opened state for receiving one of the support cables.

To enable the collar 38 to be secured around a cable 14, the collar 38 may have a two piece construction with an outer portion 48 and an inner portion/base 50. The outer portion 48 of the collar 38 may be configured to be removed or pivoted away from the inner portion/base 50 to allow the cable 14 to be placed in the center of the collar as depicted in FIG. 12. The outer portion 48 can then be secured onto the inner portion/base 50 to enclose the cable 14 within the opening 44. The outer portion 48 of the collar 38 may be removably secured to the inner portion/base 50 using a suitable type of mechanism 52, including draw latches, spring-loaded latches, catches and the like. Alternatively, the collar 38 may be formed as a one-piece structure with an opening for the cable. In this embodiment, the cable retaining structures 28 may be installed on a cable 14 prior to being secured to the solar module frame.

Figure 13:
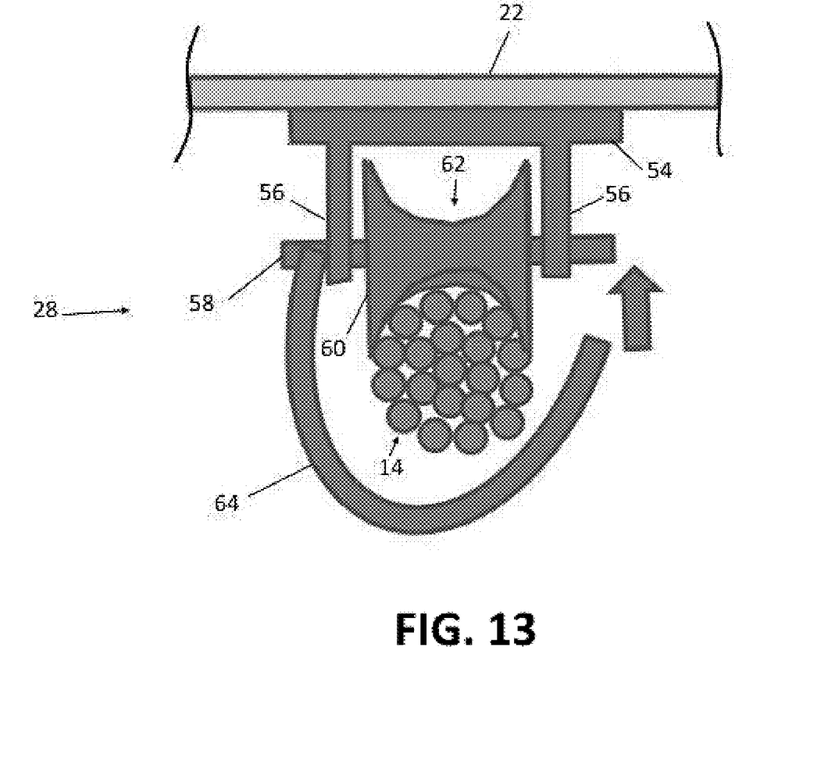
FIG. 13 depicts an embodiment of a cable retaining structure configured for rolling movement with respect to the support cables.

FIG. 13 depicts an embodiment of a cable retaining mechanism 28 configured to have a rolling engagement with a support cable. In the embodiment of FIG. 13, the cable retaining mechanism 28 comprises a base 54, axle support 56, an axle 58, and a wheel 60. The base 54 may comprise a generally flat plate that is secured to the solar module frame 22, e.g., by fasteners (not shown). The axle supports 56 extend from the base in a spaced-apart arrangement with the axle 58 extending therebetween. The wheel 60 is in turn rotatably supported on or by the axle 58.

As can be seen in FIG. 13, the outer circumference of the wheel 60 defines a deep concave groove 62 in which the cable 14 is received. The groove 62 helps to retain the wheel in engagement with the cable 14. The cable retaining structure of FIG. 13 includes a retaining bracket 64 that surrounds the cable and is secured to the cable retaining structure. The retaining bracket 64 is used to retain the cable 14 in a position to support the solar module while not touching the cable so as not to interfere with the movement of the solar module.

Figure 14:
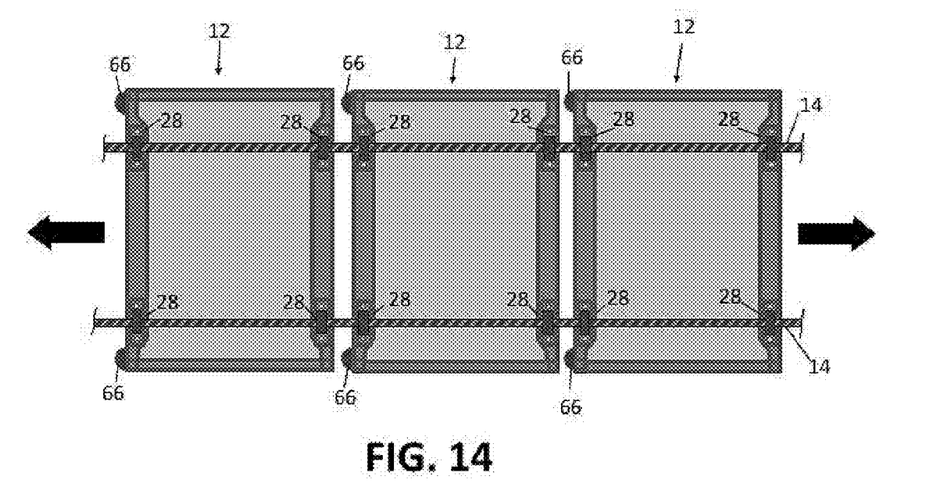
FIG. 14 depicts one embodiment of a cable retaining structure arrangement for the solar modules.

Cable retaining structures 28 may be placed on the solar modules in various configurations to attach the solar modules to the cables and enable movement of the solar modules with respect to the support structures. The number of cable retaining structures that may be used depends in part on the number of cables and in part on the desired level of stability of the solar modules 12 on the cables 14. FIG. 14 depicts an embodiment in which two cable retaining structures are used to attach the solar modules to each cable 14.

In FIG. 14, the spaced apart positioning of the two cables 14 and the four cable retaining structures 28 on each solar module 12 enables the solar modules 12 to be supported substantially by their cable retaining structures 28 alone. This allows each of the solar modules to be moved individually and independently of the other solar modules along the cable. As depicted in FIG. 14, when multiple solar modules 12 are mounted on a cable, all of the solar modules can be moved as close as possible to each other to maximize the amount of solar modules that can be placed on the cables. The solar modules 12 may be provided with bumpers that are positioned at locations where contact between adjacent solar modules is likely to occur in order to absorb the kinetic energy of such contact before it is transferred between frames.

Figure 15:
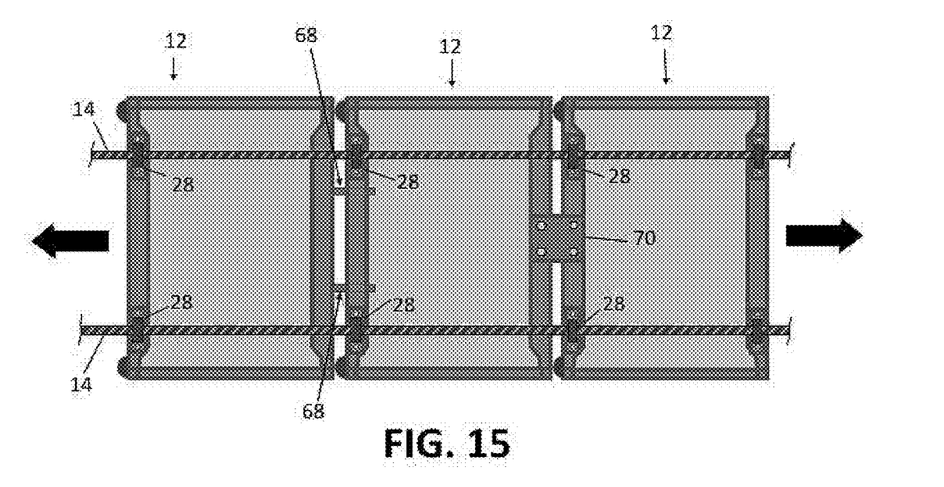
FIG. 15 depicts another embodiment of a cable retaining structure arrangement for the solar modules.

FIG. 15 depicts an alternative support configuration in which each solar module is provided with a single cable retaining structure per cable. This configuration can reduce costs but requires additional measures to enable movement of the solar modules with respect to the cables 14. To enable movement for the solar modules, the solar modules 12 are connected to each other to form a unitary structure which can be supported by the cable retaining structures of multiple solar modules.

Solar modules, such as depicted in FIG. 15, may be connected in different ways to enable movement as a unitary structure depending on the desired level of stability and freedom of movement of the individual solar modules. Examples of connections can be seen in FIG. 15. The two solar modules 12 to the left in FIG. 15 show an example of a loose type connection which is configured to allow limited freedom of movement at least axially of the solar modules with respect to each other. The loose connections may be formed by thin tabs or rods 68 that are configured to slide within slots or openings on the solar module frames 22 to allow variation in the separation between adjacent solar modules. The two solar modules 12 to the right in FIG. 15 show an example of a tight connection which is configured to restrict movement of the solar modules with respect to each other. A tight connection may be provided by one or more plates 70 that are bolted to adjacent solar module frames 22 so as to prevent variable separation between adjacent modules 12.

Figure 16:
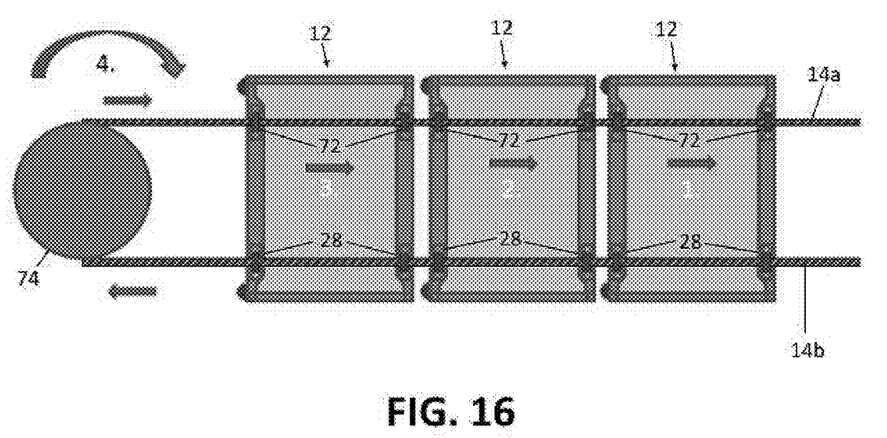
FIG. 16 depicts an embodiment of a support configuration in which the solar modules are fixed in position on one of the support cables by cable retaining structures and the support cables are drawn in or out with respect to the anchors to reposition the solar modules.
Figure 17:
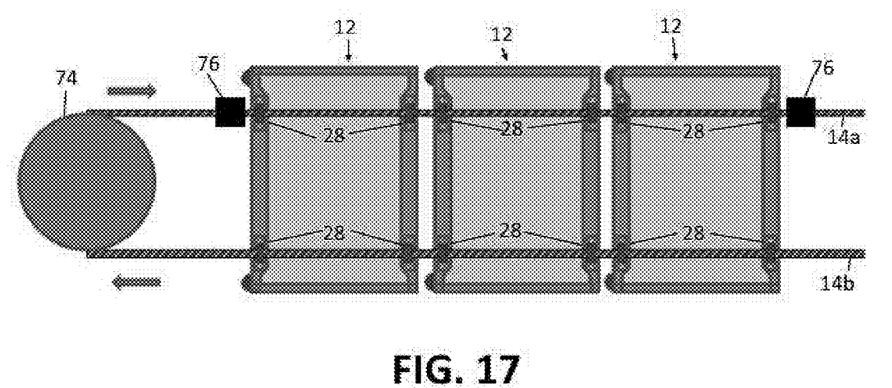
FIG. 17 depicts another embodiment of a support configuration in which the solar modules are retained within a segment of the support cables by cable anchors.

FIGS. 14 and 15 each depict support configurations in which the solar modules are along the span between anchors/supports by physically moving the solar modules 12 along the support cables 14 and without requiring movement of the cables 14. FIGS. 16 and 17 depict embodiments of support configurations in which movement of the solar modules 12 is enabled at least in part through movement of at least one of the cables.

In the embodiment of FIG. 16, each of the solar modules includes at least one fixed cable retaining structure 72 that is configured to have a fixed connection to a predetermined one of the support cables 14. The fixed cable retaining structures 72 remain attached in place on the cable and are not configured to move along the cable. The cable retaining structures of the solar module that engage the second support cable 14b are configured as movable retaining structures 28, such as depicted in FIGS. 10-13.

At least the first support cable 14a must be configured to move axially with respect to the anchors 16 to enable movement of the solar modules in FIG. 16. In the embodiment of FIG. 16, the first and second support cables 14a, 14b are formed by continuous cable loop that is rotatably supported by at least one of the anchors using a pulley system 74. In this embodiment, movement of the first support cable 14a in one direction results in movement of the second support cable 14b in the opposite direction. Due to the movable engagement between the movable cable retention structures 28 and the second support cable 14b and the fixed engagement between the first cable retention structures 72 and the first support cable 14a, the solar modules 12 move along with the first support cable 14a while sliding/rolling with respect to the second support cable 14b.

FIG. 17 depicts another embodiment of a support configuration in which at least the first cable 14a is configured to move axially between anchors/supports. In FIG. 17, however, the solar modules are not provided with fixed cable retaining structures, such as in the embodiment of FIG. 16. In FIG. 17, each of the cable retaining structures on the solar modules is configured to provide a movable engagement with the support cables. The solar modules 12 in FIG. 17 are therefore capable of being moved along the cables 14 individually and independently with respect to each other.

In the embodiment of FIG. 17, cable anchors 76 are secured in fixed positions on the first support cable 14a to prevent movement of the solar modules 12 in one or both directions along the support cable 14a. As depicted in FIG. 17, a cable anchor 76 may be positioned on the support cable 14a at one or both ends of a group of solar modules 12 to prevent movement of the solar modules in one or both directions along the support cable 14a. As depicted in FIG. 17, cable anchors 76 can be positioned to confine one or more solar modules to a section of the first support cable 14a. It should be noted that the pulleys do not need to be a permanent part of the installation. They can be used during installation on each string to install the modules in a convenient way. Then, the installer has the option to tension each end of the cable facing the modules separately, then remove the pulleys from the loop that is no longer supporting the system weight. The pulley assembly can then be moved to the next string to install the next set of modules. In the event that a module needs to be replaced at a later date, the pulley could be brought back to the site, installed and used to reel in the modules until the defective one is replaced. Then the pulley can be used to move out the replaced modules and removed in the manner described before.

It is contemplated that one or more of the cables could be used to help carry electrical current away from the solar modules. The electricity could be carried out from fixed attachment points to a third cable that requires lower tension than the support cables (and is presumably more conductive, including wire strands of copper or aluminum), or we could have sliding or rolling electrical connections to carry the electricity through the mounting hardware to the cable. One possibility is to have an electrical connector that slides easily when not energized but clamps down onto the cable when electricity is run through it. A separate electrical grounding cable with or without tension could also be a part of the system.

It can also be noted that the inventors envision the integration of solar installation electronics into the system. On short spans, each set of cable-mounted modules can be one electrical string, and the combiner boxes can be located at the ends of the cables. Alternately, if the span were long enough to require it, the cables could have inverters connected to the modules that also roll along the cable and even combiner electronics along the cable to manage the voltage and current coming out of the group of modules.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A solar panel installation comprising:
   at least one support cable;
   a first anchor structure and a second anchor structure configured to hold the at least one support cable in suspension there between; and
   at least one solar module including:
      a laminate comprising a planar solar collection area,
      a photovoltaic cell mounted within said area, and
      a junction box electrically connected to at least one of said photovoltaic cells; and
   at least one cable retaining structure,
   wherein the at least one cable retaining structure is configured to be slidably attached to the at least one support cable,
   wherein the at least one support cable is configured to support the solar module aloft when the at least one support cable is being held in suspension between the first and the second anchor, and
   wherein the solar module is configured to be slid along the at least one support cable between the first and the second anchor structure when the solar module is being held aloft by the at least one support cable,
   wherein the at least one support cable comprises a first support cable and a second support cable, the first and the second support cable each being configured to be held in suspension between the first and the second anchor structure and arranged such that the first and the second support cable are substantially parallel to each other and spaced apart horizontally in relation to each other,
   wherein the at least one cable retaining structure comprises a first pair of cable retaining structures proximate a first end of the laminate and a second pair of cable retaining structures proximate a second end of the laminate,
   wherein the first pair of cable retaining structures is configured to be attached to the first support cable and the second pair of cable retaining structures is configured to be attached to the second support cable, and
   wherein only the first support cable and the second support cable are used to hold the solar module aloft
   wherein the at least one solar module comprises a plurality of solar modules,
   wherein the plurality of solar modules are configured to be slidably supported side-by-side on the first and the second support cables, respectively, by the first and the second cable retaining structures,
   wherein the first and the second support cable is formed by a continuous cable loop that is wrapped around a first pulley structure at the first anchor structure and wrapped around a second pulley structure at the second anchor structure, the first cable being formed by a first portion of the cable loop and the second cable being formed by a second portion of the continuous cable loop,
   wherein the first cable retaining structures of the plurality of solar modules are configured to form a fixed attachment to the first portion of the cable loop,
   wherein the second cable retaining structures of the plurality of solar modules form a sliding attachment to the second portion of the cable loop,
   wherein the cable loop is configured to be rotated about the first and the second pulley structure, the rotation of the cable loop causing the first portion of the cable to move in a first direction between the first and second anchor structures and the second portion of the cable to move in a second direction that is opposite the first direction,
   wherein, as the cable loop rotates, the fixed attachment between the first cable retaining structures and the first portion of the cable loop and the sliding attachment between the second cable retaining structures and the second portion of the cable loop results in movement of the solar modules in the first direction with the first portion of the cable.

2. The solar panel installation of claim 1, wherein the first support cable is suspended at a position that is offset vertically from the second support cable such that the solar module is supported in a slanted orientation relative to horizontal.

3. The solar panel installation of claim 1, wherein the at least one first cable retaining structure and the at least one second cable retaining structure are slidably and rotatably attached to the first and the second support cables, respectively.

4. The solar panel installation of claim 3, wherein the first and the second cable retaining structures include bearings for engaging the first and the second support cables.

5. The solar panel installation of claim 4, wherein the first and the second cable retaining structures include wheels for engaging the first and the second support cables, respectively.

6. The solar panel installation of claim 1, further comprising one or more mid-span supports holding the first and second cable elevated on wheel or in bearing.

7. The solar panel installation of claim 1, wherein the panels are electrically connected to at least one of the supporting cables, and wherein the support cable forms a part of the overall electrical circuit.

8. A method for a solar panel installation, comprising:
   slidably attaching a first solar module to a first support cable and a second support cable using cable retaining structures of the first solar module, the first support cable and the second support cable being suspended between a first anchor structure and a second anchor structure, the first solar module being attached and held aloft by the first and second support cables at a first position between the first anchor structure and the second anchor structure;
   sliding the first solar module from the first position to a second position between the first anchor structure and the second anchor structure; and
   slidably attaching a second solar module to the first support cable and the second support cable using cable retaining structures of the second solar module at the first position after the first solar module has been slid to the second position,
   wherein the cable retaining structures of the first solar module and the second solar module comprise a respective first pair of cable retaining structures positioned proximate a first end of the first and the second solar modules, respectively, and a respective second pair of cable retaining structures positioned proximate a second end of the first and the second solar module, respectively,
   wherein the first pairs of cable retaining structures are configured to be attached to the first support cable and the second pairs of cable retaining structures are configured to be attached to the second support cable, and
   wherein only the first support cable and the second support cable are used to hold the first and the second solar modules aloft electrically connecting the first solar module to the second solar module, wherein the first and the second solar module each include:

a laminate comprising a planar solar collection area, a photovoltaic cell mounted within said area, and a junction box electrically connected to at least one of said photovoltaic cells; and first and second cable retaining structures secured to the frame configured to be slidably attached to the first and second support cables, wherein the first support cable is suspended at a position that is offset vertically from the second support cable such that the frames of the first and second solar modules are supported in a slanted orientation relative to horizontal, wherein the first and the second support cable is formed by a continuous cable loop that is wrapped around a first pulley structure at the first anchor structure and wrapped around a second pulley structure at the second anchor structure, the first cable being formed by a first portion of the cable loop and the second cable being formed by a second portion of the continuous cable loop, wherein the first solar module is moved from the first position to the second position by rotating the cable loop about the first and second pulley structures, wherein the first cable retaining structures of the first and second modules are configured to form a fixed attachment to the first portion of the cable loop, wherein the second cable retaining structures of the first and second solar modules are configured to form a sliding attachment to the second portion of the cable loop, wherein the cable loop is configured to be rotated about the first and the second pulley structure, the rotation of the cable loop causing the first portion of the cable to move in a first direction between the first and second anchor structures and the second portion of the cable to move in a second direction that is opposite the first direction, and wherein, as the cable loop rotates, the fixed attachment between the first cable retaining structures and the first portion of the cable loop results in movement of the first solar module in the first direction with the first portion of the cable while the sliding attachment between the second cable retaining structures and the second portion of the cable loop allows the first solar module to slide along the second cable portion as the second cable portion moves in the second direction.

9. The method of claim 8, further comprising:

sliding the first solar module from the second position to a third position between the first anchor structure and the second anchor structure;

sliding the second solar module from the first position to the second position between the first anchor structure and the second anchor structure; and slidably attaching a third solar module to the first support cable and the second support cable at the first position after the first solar module and the second solar module have been slid to the third and second positions, respectively.

10. The method of claim 8, wherein the first cable retaining structures or the second cable retaining structures include bearings or wheels for engaging the corresponding one of the first and the second support cable, respectively.

* * * * *